(12) United States Patent
Kasuga (10) Patent No.: US 6,894,738 B2
(45) Date of Patent: May 17, 2005

(54) LAMP UNIT, LIGHT GUIDE PLATE, LIQUID CRYSTAL DISPLAY, AND METHOD FOR ASSEMBLING THEM

(75) Inventor: Koji Kasuga, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 35 days.

(21) Appl. No.: 10/087,787

(22) Filed: Mar. 5, 2002

(65) Prior Publication Data

US 2002/0126237 A1 Sep. 12, 2002

(30) Foreign Application Priority Data

Mar. 5, 2001 (JP) .......................................... 2001-060239

(51) Int. Cl.⁷ .......................................... G02F 1/1333
(52) U.S. Cl. ......................................................... 349/58
(58) Field of Search .............................. 349/58, 65, 63

(56) References Cited

U.S. PATENT DOCUMENTS

| | | | | |
|---|---|---|---|---|
| 5,375,005 A | * | 12/1994 | Komano | 359/48 |
| 5,504,605 A | * | 4/1996 | Sakuma et al. | 359/83 |
| 5,886,758 A | * | 3/1999 | Ibaraki | 349/58 |
| 5,966,191 A | | 10/1999 | Lee | |
| 6,046,785 A | | 4/2000 | Won | |
| 6,123,430 A | | 9/2000 | Ono et al. | |
| 6,147,725 A | | 11/2000 | Yuuki et al. | |
| 6,163,350 A | | 12/2000 | Ihara | |
| 6,175,396 B1 | | 1/2001 | Kim et al. | |
| 6,181,071 B1 | | 1/2001 | Yuuki et al. | |
| 6,203,158 B1 | * | 3/2001 | Furuhaka et al. | 353/31 |
| 6,411,359 B1 | * | 6/2002 | Kobayashi et al. | 349/149 |
| 6,456,279 B1 | * | 9/2002 | Kubo et al. | |

FOREIGN PATENT DOCUMENTS

| | | |
|---|---|---|
| JP | A 6-51905 | 2/1994 |
| JP | 11-84351 | 3/1999 |
| JP | 2001-33781 | 2/2001 |

* cited by examiner

Primary Examiner—Robert H. Kim
Assistant Examiner—Thoi V. Duong
(74) Attorney, Agent, or Firm—Young & Thompson (57) ABSTRACT

A liquid crystal display includes a liquid crystal display panel, a lamp unit including a lamp and a lamp holder, a light guide plate, and a case assembly. The case assembly includes a rear case behind the liquid crystal display panel. The rear case has the lamp holder and light guide plate on a surface thereof in a manner to hold them in operative relationship, with the lamp holder kept independent from the light guide plate.

18 Claims, 12 Drawing Sheets

LAMP UNIT, LIGHT GUIDE PLATE, LIQUID CRYSTAL DISPLAY, AND METHOD FOR ASSEMBLING THEM

BACKGROUND OF THE INVENTION

1. Field of the Invention

The present invention relates to a liquid crystal display, and also to a method for assembling a lamp unit, a light guide plate and a liquid crystal display panel.

2. Description of the Related Art

Liquid crystal displays are widely spread as image display devices for personal computers and various other monitors. Liquid crystal displays of the kind generally comprise a back light, a planar light source for illumination, on a rear surface of a liquid crystal display panel to apply light to a liquid crystal surface with a predetermined spread in a fashion providing a uniform brightness.

Such a backlight uses a fluorescent lamp with a hot or cool cathode as a light source. The backlight conventionally uses two methods, that is a direct-light type and a side light type (an edge light type). The direct-light type has the fluorescent lamp placed immediately below the liquid crystal display. On the other hand, the side light type has the fluorescent lamp installed on two sides or one side of a light guide plate made of a transparent resin so that light incident on the light guide plate is directed toward a liquid crystal display panel surface by a reflection section on a rear surface of the light guide plate. The light is then diffused into a uniform planar light.

The side light type back light may be thinner that the direct-light type and is thus suitable for display devices for portable equipment such as notebook computers.

Under growing demand for thinner and less expensive display devices, a need remains for a liquid crystal display that is easy to assemble and maintain.

As described in JP-A 6-51905, it is the conventional practice to use a backlight unit or module, which has been pre-assembled, is used in fabricating a liquid crystal display. If a lamp used in such backlight unit fails to illuminate, it is therefore the conventional practice to replace the backlight unit with a new one, requiring cost one user and skilled labor.

SUMMARY OF THE INVENTION

An object of the present invention is to provide a liquid crystal display, which meets the above-mentioned need.

According to one exemplary implementation of the invention, there is provided a liquid crystal display comprising:
a liquid crystal display panel;
a lamp unit including a lamp and a lamp holder receiving said lamp;
a light guide plate; and
a case assembly including a rear case behind said liquid crystal display panel, said rear case having said lamp unit and said light guide plate on a surface thereof in a manner to hold them in operative relationship, with said lamp unit kept independent from said light guide plate.

BRIEF DESCRIPTION OF THE DRAWINGS

The foregoing and other objects, features and advantages of the invention will be apparent from the following more particular description of exemplary embodiments of the invention as illustrated in the accompanying drawings. The drawings are not necessarily scale, emphasis instead being placed upon illustrating the principles of the invention.

DESCRIPTION OF THE EXEMPLARY EMBODIMENTS

Referring to the accompanying drawings, the same reference numerals are used to designate same or similar parts or portions throughout each view of FIGS. 1 to 13 for the sake of brevity of description.

Figure 1:
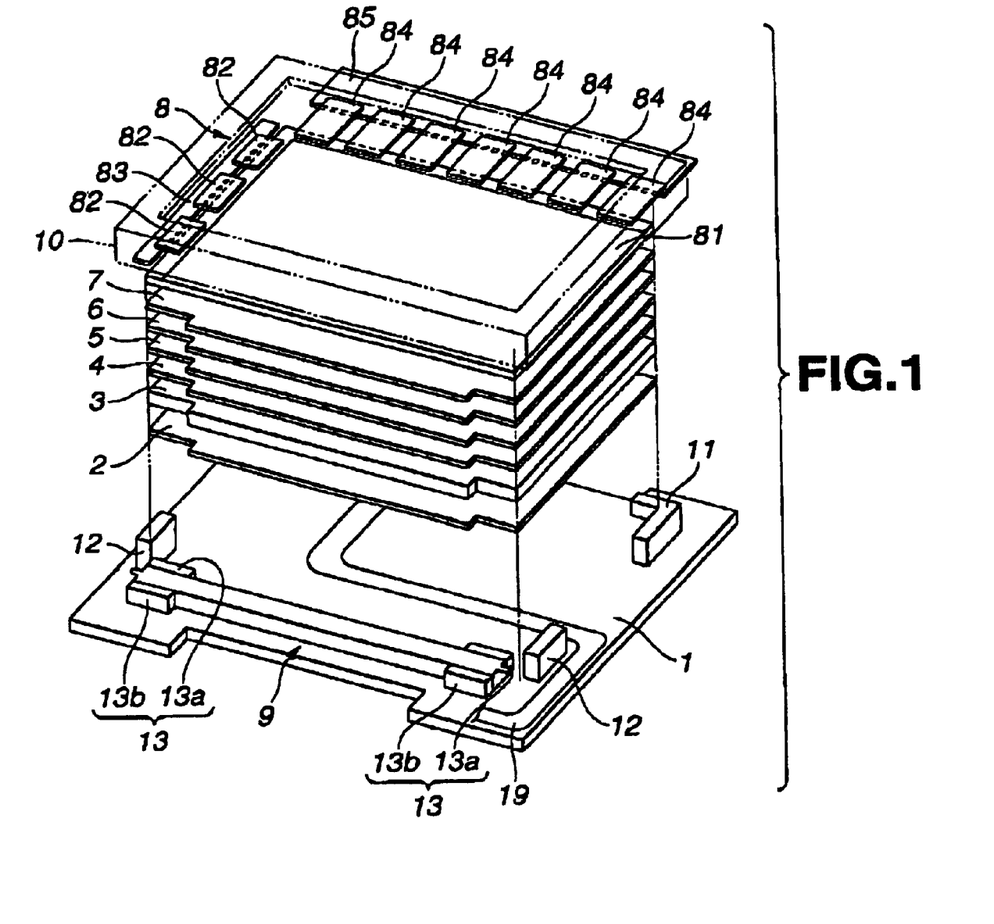
FIG. 1 is a perspective exploded view of an exemplary embodiment of a liquid crystal display according to the present invention.

With reference to FIGS. 1 to 8, the first exemplary embodiment of a liquid crystal display according to the present invention is described. In FIG. 1, a liquid crystal display comprises a liquid crystal display panel 8, a lamp unit generally indicated at 9, a light guide plate 3, and a case assembly including a rear case 1 behind the liquid crystal display panel 8. The case assembly also includes a front case with a display window, illustrated by the phantom line and indicated at 10.

Figure 2:
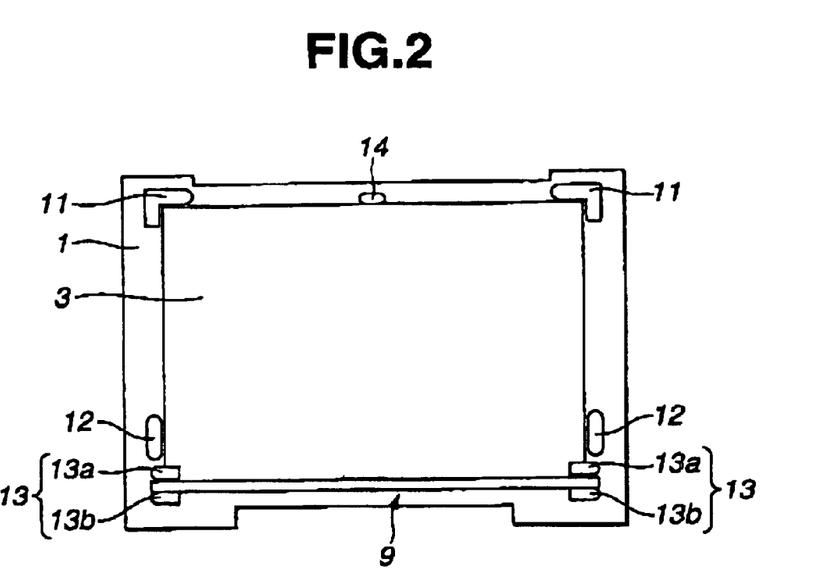
FIG. 2 is a top plan view of the liquid crystal display with unnecessary parts removed to show a rear case having a lamp holder and a light guide plate on a surface thereof in a manner to hold them in operative relationship, with the lamp holder independent from the light guide plate.

Through the window of the front case 10, a display portion 81 of the liquid crystal display panel 8 is exposed. The liquid crystal display panel 8 includes a number of flexible tape carrier packages (TCPs) 82, which provide connection between scan lines within the display portion 81 and a substrate 83, and also includes a number of flexible TCPs 84, which provide connection between signal lines within the display portion 81 and a substrate 85. In order for the display portion 81 to receive light from the lamp unit 9, a diffusion sheet 4, a prism or lens sheet 5, a prism or lens sheet 6 and a diffusion sheet 7 are interposed between a surface on the backside of the display portion 81 and a light outgoing surface of the light guide plate 3. The light guide plate 3 includes a light incoming surface on one side of a peripheral edge thereof. In particular, the light guide plate 3 is rectangular and has four sides. With regard to the one side that is formed with the incoming surface, the light guide plate 3 is cutout inwardly from this side at two end portions thereof. As best seen in FIG. 2, at such cutouts, the light guide plate partially receives two spaced retainers 13, locating the incoming surface in close relationship with the lamp unit 9. At its end portions, the lamp unit 9 is disposed in the retainers 13. To guide light from the incoming surface toward the outgoing surface, a reflector sheet 2 is interposed between the opposite surface of the light guide plate 3 to the outgoing surface and a surface of the rear case 1.

With continuing reference to FIGS. 1 and 2, in the exemplary embodiment, the rear case 1 has the lamp unit 9 and the light guide plate 3 on the same surface thereof in a manner to hold them in operative relationship, with the lamp unit 9 kept independent from the light guide plate 3. The rear case 1 includes two spaced corner elements 11 adjacent two corners of the light guide plate 3 of the remotest side from the lamp unit 9, and two spaced lateral side elements 12 adjacent two spaced lateral sides of the light guide plate 3. The corner elements 11 are fixedly secured to the light guide plate 3. They may be integrally formed with or tightly fastened to the rear case 1. The corner elements 11 are formed with walls cooperating with the associated corners of the light guide plate 3, respectively. In the embodiment, such walls stand upright from the surface of the light guide plate 3. The lateral side elements 12 are fixedly secured to the rear case 1. They may be integrally formed with or tightly fastened to the rear case 1. The lateral side elements 12 are formed with two opposed walls, which cooperate with one and the opposite lateral sides of the light guide plate 3, respectively. The rear case 1 also includes two retainers 13, which are spaced to receive one and the opposite end portions of a lamp holder 91 of the lamp unit 9. In the embodiment, each of the retainers 13 includes a pair of parallel elements 13a, 13b fixedly secured to the rear case 1. The retainers 13 may be integrally formed with or tightly fastened to the rear case 1. The retainer elements 13a, 13a cooperate with the bottoms of the cutouts of the light guide plate 3, respectively, between which the incoming surface is defined. In the embodiment, the elements 11, 12 and 13a cooperate with each other to locate the light guide plate 3 on the surface of the rear case 1 at the illustrated predetermined position with respect to the lamp unit 9 in FIG. 2. These elements 11, 12 and 13a are located adjacent to different portions of the peripheral edge of the light guide plate 3.

Figure 7:
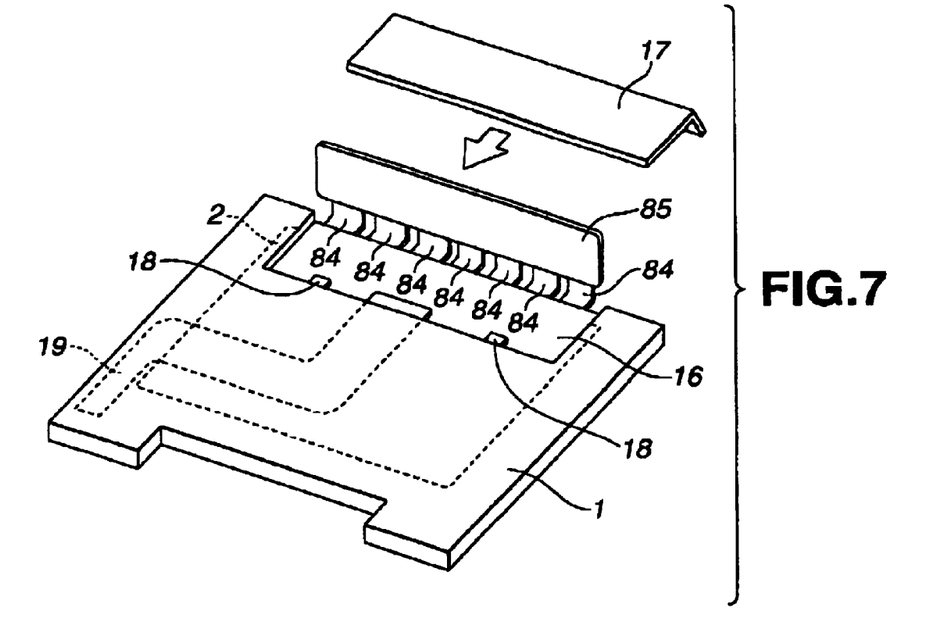
FIG. 7 is a bottom perspective view of the liquid crystal display with a lid removed to illustrate a substrate storage portion formed within the backside of the rear case.

In the embodiment, in assembly, these elements 11, 12 and 13a assist in forming a laminated structure of the reflector sheet 2, light guide plate 3, diffusion sheet 4, prism sheets 5, 6, diffusion sheet 7 and display portion 81 of the liquid crystal display panel 8. Subsequently, the front case 10 is fixedly connected to the rear case 1. This is followed by putting the substrate 85 into a storage portion in the form of a counter bore 16 recessed from a surface on the backside of the rear case 1 as best seen in FIG. 7. A lid 17 is provided to conceal this storage portion 16. The flexibility of the TCPs 84 allows for such a travel of the substrate 85 from the front case 10 to the backside of the rear case 1.

With reference to FIG. 7, the storage portion 16 of the rear case 1 is described. As illustrated by the dotted line, an interface cable 19 extends to the bottom or inward end of the storage portion 16 for electrical coupling with terminals of various circuit components, not shown, within the substrate 85 via pin and hole coupling. Projections 18 extend into the storage portion 16 from the bottom. The lid 17 is formed with portions, not shown, such as holes, receiving the projections 18.

It will be appreciated from the preceding description that the TCPs 84 extends around the case assembly to permit the substrate 85 to couple with the interface cable 19 at the storage portion 16 on the backside of the rear case 1. This make an assembly work easy because it is no longer necessary to put the TCPs 84 into the case assembly during assembly.

Figure 13:
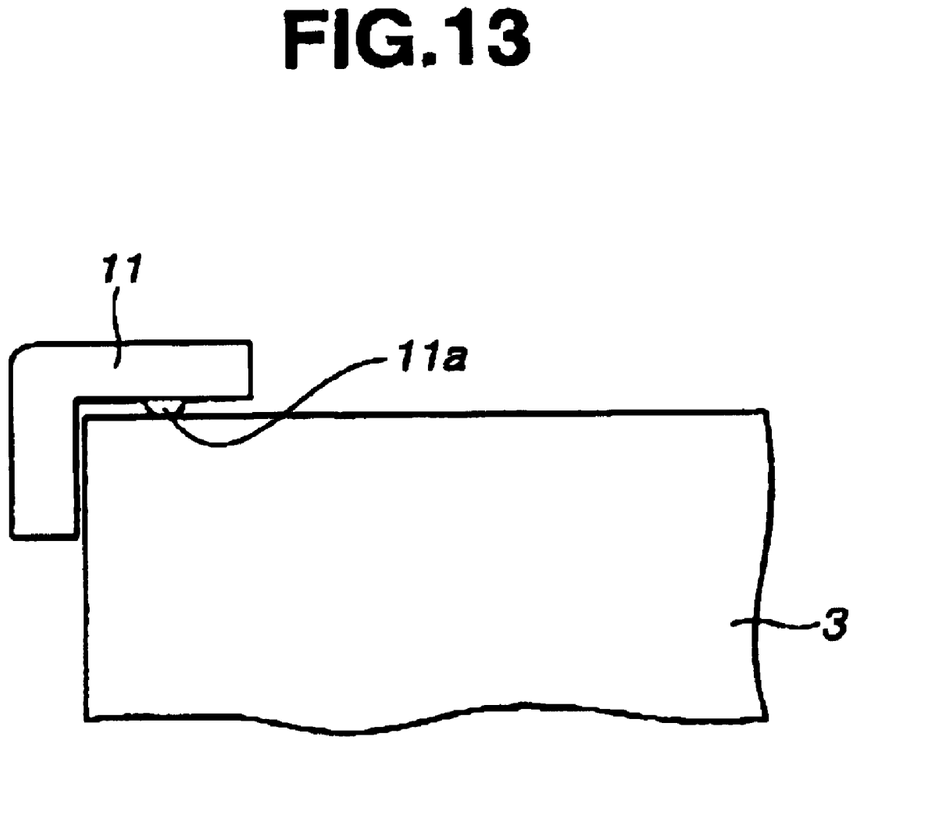
FIG. 13 is a plan view of a corner portion of the liquid crystal display with unnecessary parts removed to illustrate one of elements locating and urging the light guide plate into close relationship with the lamp unit.

With reference again to FIG. 2, the rear case 1 may be provided with a device for urging the light guide plate 3 in a downward direction viewing in this Figure, into close relationship with the lamp unit 9. There are various examples of such an urging device. One example includes a projection 14 located between the spaced corner elements 11 for firm engagement with the peripheral edge of the light guide plate 3. The firm engagement between the projection 14 and the peripheral edge of the light guide plate 3 is established toward completion of locating the light guide plate 3 by corner elements 11 and lateral side elements 12. Reaction due to this firm engagement urges the light guide plate 3 to move into closer relationship with the lamp unit 9. Another example may employ elasticity of a bias element of elastic material, such as rubber, to bias the light guide plate 3 into firm engagement with the retainer elements 13a, 13a, to accomplish close relationship with the lamp unit 9. Location of such urging device is not limited to a location between the corner elements as illustrated in FIG. 2. Other example employs such projections 11a within walls of the corner elements 11 as illustrated in FIG. 13. In this example, projections 11a urges the light guide plate 3 to accomplish close relationship with the lamp unit 9. Still other example utilizes elasticity of a bias element of elastic material, such as rubber, to apply force at each of a plurality of points between the corner elements 11 inclusive to bias the light guide plate 3 into firm engagement with the retainer elements 13a, 13a, to accomplish close relationship with the lamp unit 9.

From the preceding description, it will now be appreciated that the rear case 1 holds the light guide plate 3 and lamp unit 9 in operative relationship, with the lamp unit 9 kept independent from the light guide plate 3. In the embodiment, the provision of retainers 13 keeps the lamp unit 9 independent. This allows for easy replacement of the lamp unit 9 with a new one only by removing the front case 10 out of engagement with the rear case 1.

With reference to FIGS. 3, 4, 6 and 8, the lamp unit 9 will be described below. The lamp unit 9 is designed such that it is easy to mount and remove without any special skilled labor or tool.

Figure 3:
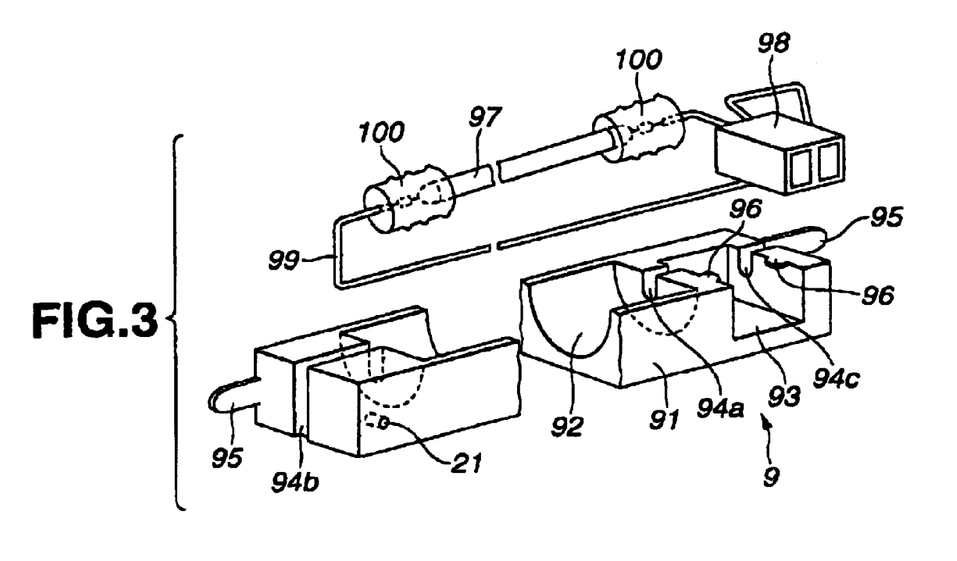
FIG. 3 is a perspective exploded view of a lamp unit including the lamp holder.
Figure 4:
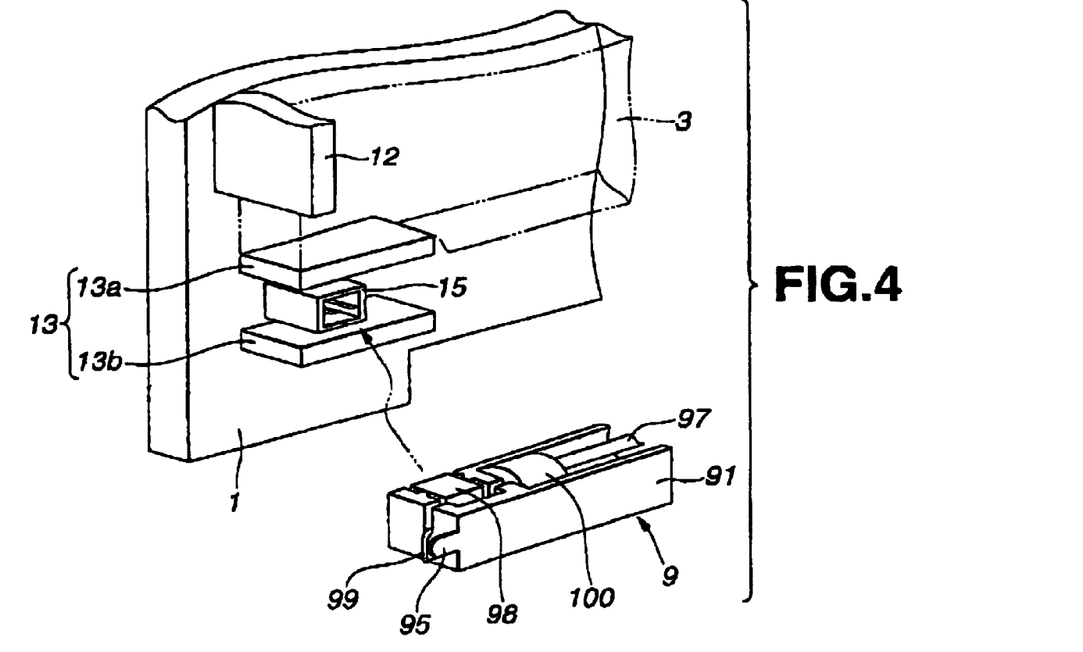
FIG. 4 is a perspective view of a corner portion of the rear case, illustrating a retainer formed on the rear case and a socket for the lamp unit.
Figure 5A:
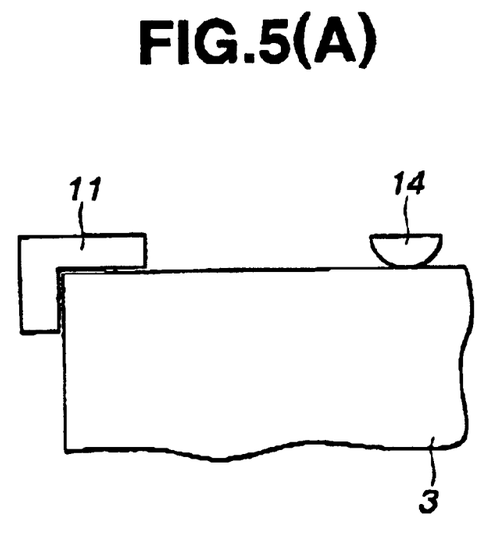
FIG. 5(A) is a plan view of a corner portion of the liquid crystal display with unnecessary parts removed to illustrate one of elements locating the light guide plate and an element urging the light guide plate into close relationship with the lamp unit.
Figure 5B:
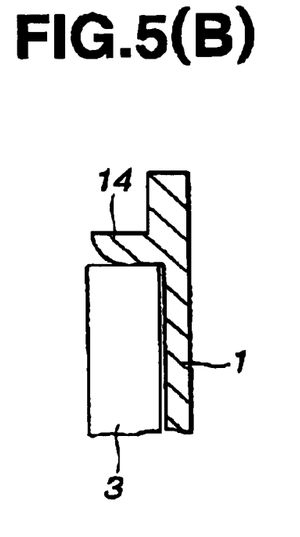
FIG. 5(B) is a cross section of the portion of the rear case shown in FIG. 5(A), illustrating engagement between the urging element and a peripheral edge of the light guide plate.
Figure 6:
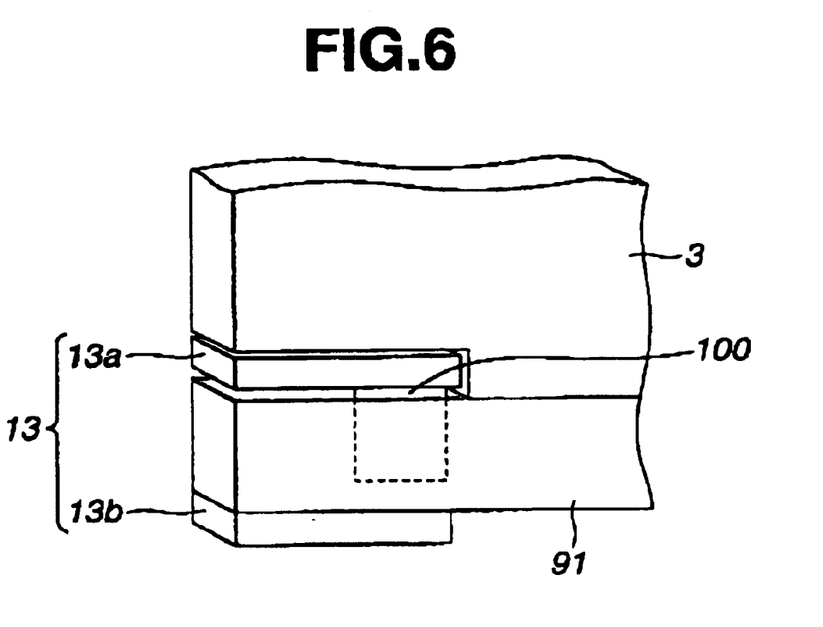
FIG. 6 is a perspective view of a corner portion of the liquid crystal display with unnecessary parts removed to illustrate a retainer, which retains one end portion of the lamp holder.

As best seen in FIG. 3, the lamp unit 9 comprises a lamp 97 and a lamp holder 91. The lamp holder 91 receives the lamp 97 in a manner to allow for easy removal in case of replacement. In the embodiment, the rear case 1 has a socket 15 between the elements 13a and 13b of one of the two retainers 13 as seen in FIG. 4. The socket 15 faces in a direction inward of the liquid crystal display away from the inner surface of the rear case 1.

With continuing reference to FIGS. 3 and 4, the lamp holder 91 is an elongate structural piece having two spaced flat sidewalls interconnected by two spaced top and bottom walls interconnecting the two sidewalls. When received in the retainers 13, the two sidewalls face the inner walls of the retainer elements 13a and 13b at each of the retainers 13. The bottom wall faces the surface of the rear case 1. The lamp holder 91 is formed with a semi-cylindrical groove 92 extending in the longitudinal direction. The groove 92 is open within one of the two sidewalls. Within the groove 92, the lamp 97 is located. In the embodiment, the semi-cylindrical wall defining this groove 92 is covered with a reflector sheet. In this case, the semi-cylindrical groove 92 with the reflector sheet serves as a reflector partly surrounding the lamp 97 to direct light to impinge onto the incoming surface on the peripheral edge of the light guide plate 3. At the one end portion of the lamp holder 91 that faces the socket 15, a cutout 93 is formed for receiving a connector 98. The cutout 93 communicates with the groove 92 at one end thereof via channel 94a running along the sidewall. From the opposite end of the groove 92, a channel 94b runs along the sidewall toward the adjacent end of the lamp holder 91. This channel 94b runs further in a manner to cross the end of the lamp holder 91 down to the opposite sidewall thereof (see FIG. 3). From the cutout 93 toward the opposite end of the lamp holder 91, a channel 94c extends along the one sidewall and further extends in a manner to cross the opposite end of the lamp holder 91 down to the opposite sidewall thereof in a similar manner as the channel 94b runs. The channel 94c runs further through the opposite sidewall in the longitudinal direction until it meets with the channel 94b.

As will be seen from FIGS. 3 and 4, the cutout 93 is open within the bottom wall of the lamp holder 91 facing the socket 15. Outwardly extending from the ends of the top wall of the lamp holder 91 are ears or handles 95 of the size and shape easy to be pulled by fingers of an operator.

At the opposite ends, the lamp 92 is connected by welding, for example, to two ends of cables 99, which are connected by press fittings to the connector 98. Protector sleeves 100 of silicon rubber cover the welding connections at the ends of the lamp 92. Each of the protector sleeves 100 has a number of projections on its outer cylindrical wall thereof for firm engagement with the semi-cylindrical wall of the groove 92 to hold the lamp 97 is appropriate position within the groove 92. The connector 98 is put into the cutout 93 and held therein by a claw-like projection 96. The cables 99 are inserted into the channels 94a, 94b and 94c. When the lamp holder 91 is received in the retainers 13, the protector sleeves 100 are located within the retainers 13 as readily seen from FIG. 6. In particular, the protector sleeves 100 are brought into engagement with the retainer elements 13a, respectively.

With reference again to FIG. 3, a through hole 21 is formed through the top wall to the bottom wall of the lamp holder 91 to allow for the passage of a fastener pin. With such fastener pin and the coupling of the connector 98 with the socket 15, the lamp holder 91 is fixedly secured to the rear case 1 at the retainers 13. This manner of fixedly securing the lamp holder 91 to the rear case 1 is not limited to this example. For example, other fasteners may be used, or other dummy socket may be provided, or adhesive tape may be used.

Figure 8:
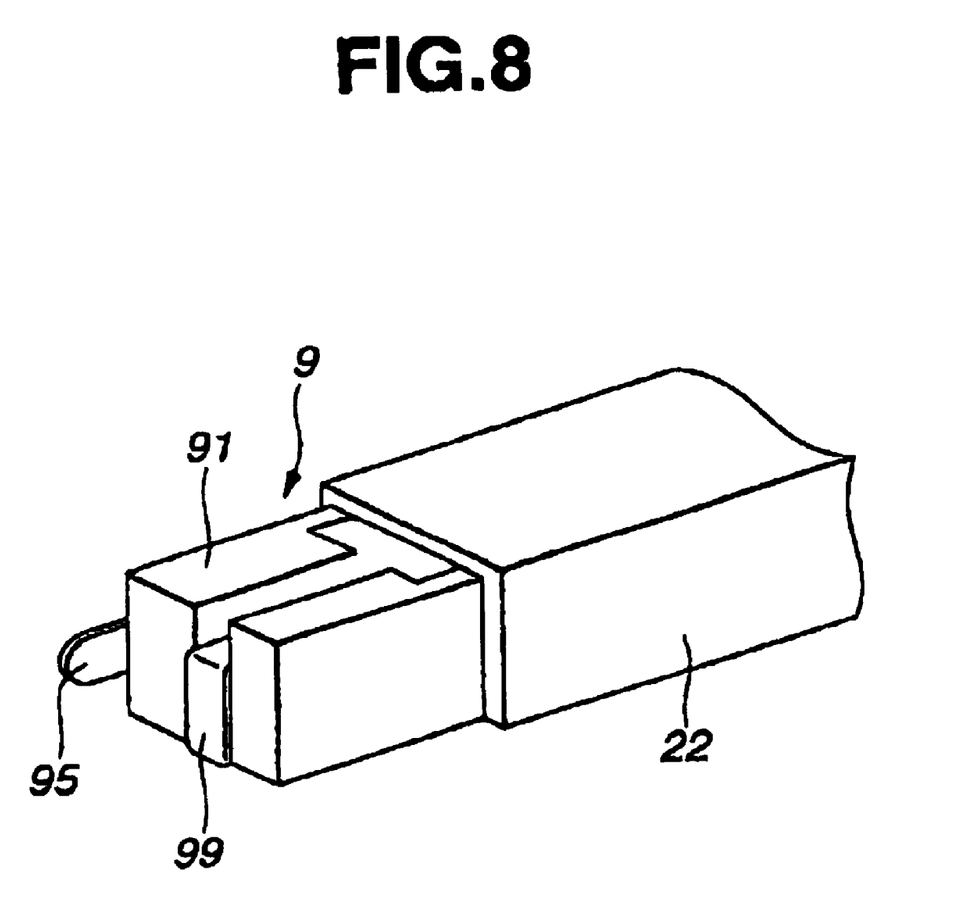
FIG. 8 is a perspective view of a carrier container for the lamp unit.

FIG. 8 shows a carrier container 22 for receiving a lamp unit 9. With such container 22, the possibility that the lamp unit 9 might be damaged can be minimized.

In the previously described embodiment, the front case 10 needs to be removed to provide an access to the lamp unit 9 because the retainers 13 open toward the front case 10. A need remains therefore to allow for easy access to the lamp unit 9 without removing the front case 10.

Figure 9:
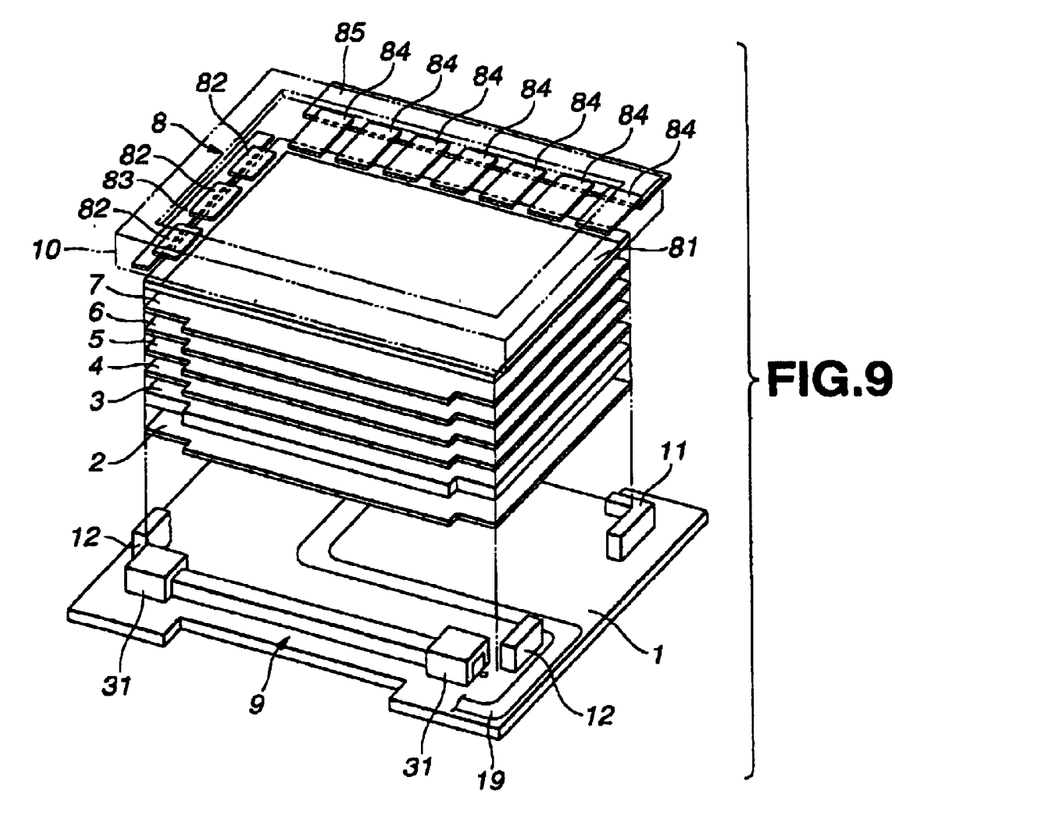
FIG. 9 is a perspective exploded view of a second exemplary embodiment of a liquid crystal display according to the present invention.
Figure 10:
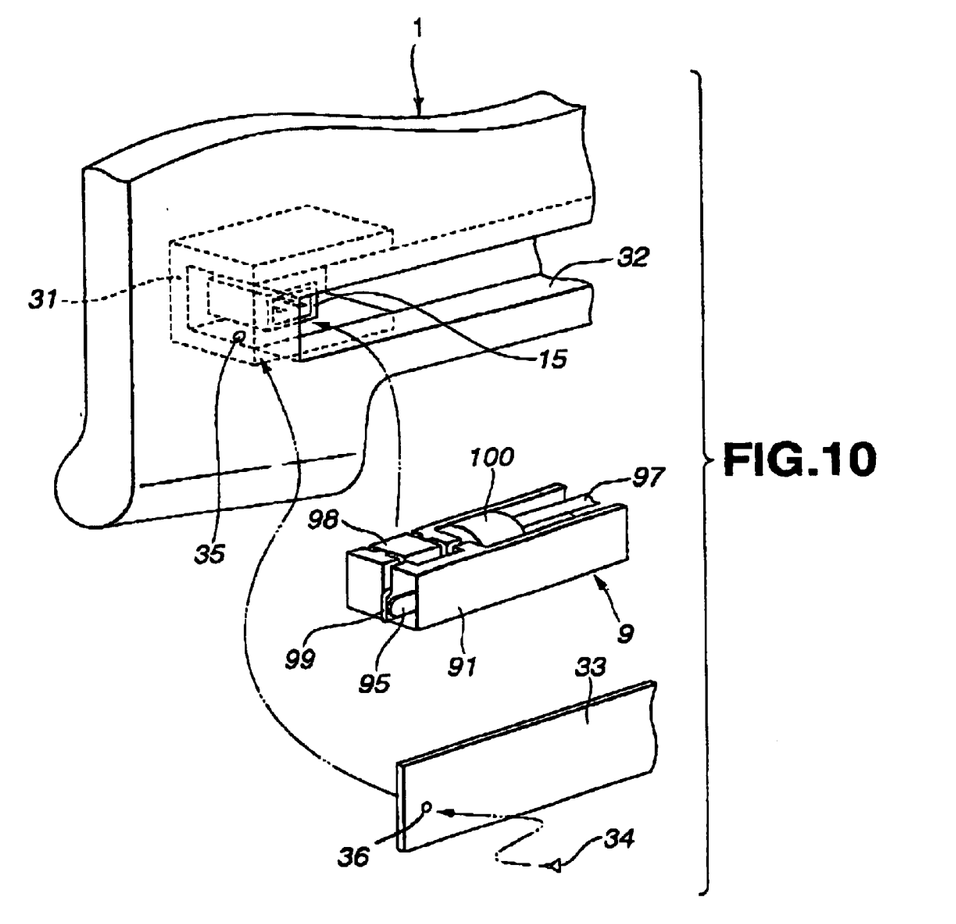
FIG. 10 is a perspective view of a modified rear case of the liquid crystal display according to the second exemplary embodiment with a lid removed, illustrating a modified retainer with a socket and a rectangular opening providing access to a lamp unit.
Figure 11:
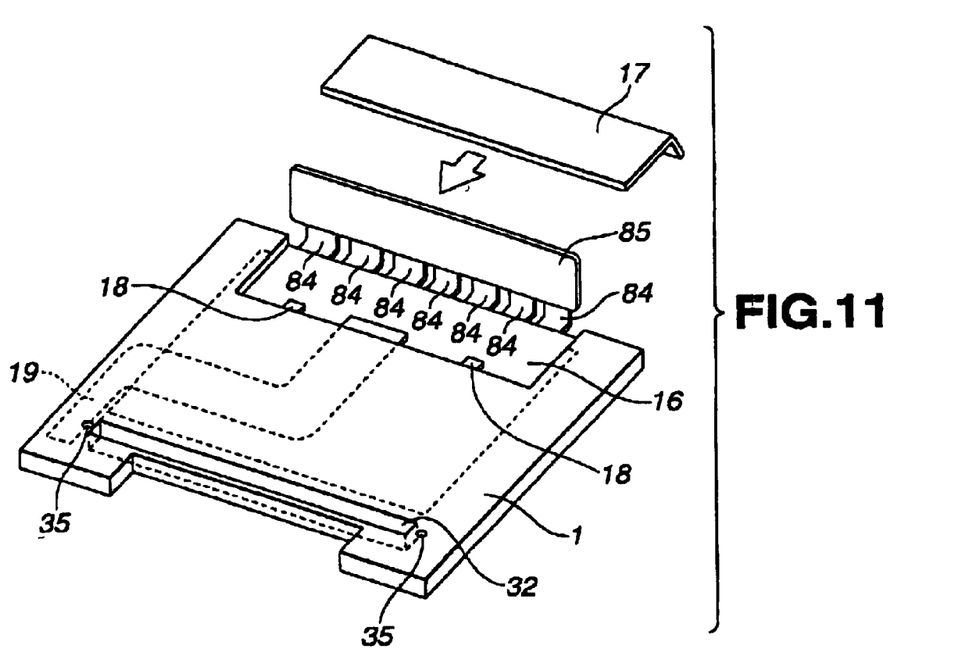
FIG. 11 is a bottom perspective view of the liquid crystal display with a lid removed to illustrate a substrate storage portion formed within the backside of the modified rear case.

With reference to FIGS. 9–11, the second exemplary embodiment of a liquid crystal display meets the above-mentioned need by employing a modified rear case 1. This second embodiment is substantially the same as the first embodiment except the provision of the modified rear case. As seen in FIGS. 10 and 11, the modified rear case 1 is formed with an elongate rectangular opening 32 providing an access to a lamp holder 91. A lid 33 is provided to close this access opening 32. The modified rear case 1 includes two spaced bridge type retainers 31 over the opening 32 to receive the lamp unit 9. The bridge type retainers 31 are substantially the same as the retainers 31 used in the first exemplary embodiment, except the provision of a top plate interconnecting two parallel retainer elements 13a and 13b. In the second exemplary embodiment, a socket 15 is provided on the inner wall of the top plate of one of the bridge type retainers 31 as best seen in FIG. 10. After inserting the lamp unit through the access opening 32, the lid 33 closes the opening 32 and attached to the backside of the modified rear case 1 by fasteners, only one being shown at 34 in FIG. 10. The modified rear case 1 is formed with two holes 32 adjacent the longitudinal ends of the access opening 32 (see FIG. 11), while the lid 33 is formed with two holes, only one being shown at 36 in FIG. 10. Through such openings 32 and 36, the fasteners 34 extend to fixedly attach the lid 33 to the backside of the modified rear case 1.

Figure 12:
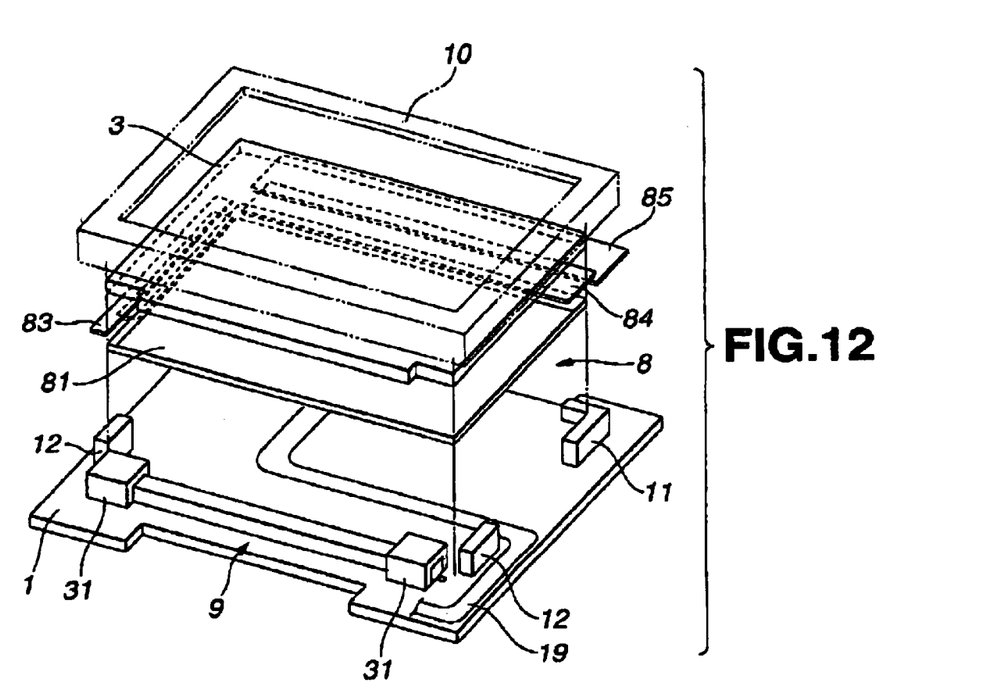
FIG. 12 is a perspective exploded view of a third exemplary embodiment of a liquid crystal display according to the present invention.

With reference to FIG. 12, the third exemplary embodiment of a liquid crystal display is illustrated. The third exemplary embodiment is substantially the same as the second exemplary embodiment except that the present invention is implemented in a liquid crystal display of the front light type in FIG. 12. In FIG. 12, a display portion 81 of a liquid crystal display 8 is interposed between a surface of a rear case and a light guide plate 3. In this embodiment, locating elements 11 and 12 cooperate with retainers 31 to locate the liquid crystal panel 8 as well as the light guide plate 3.

Figure 14:
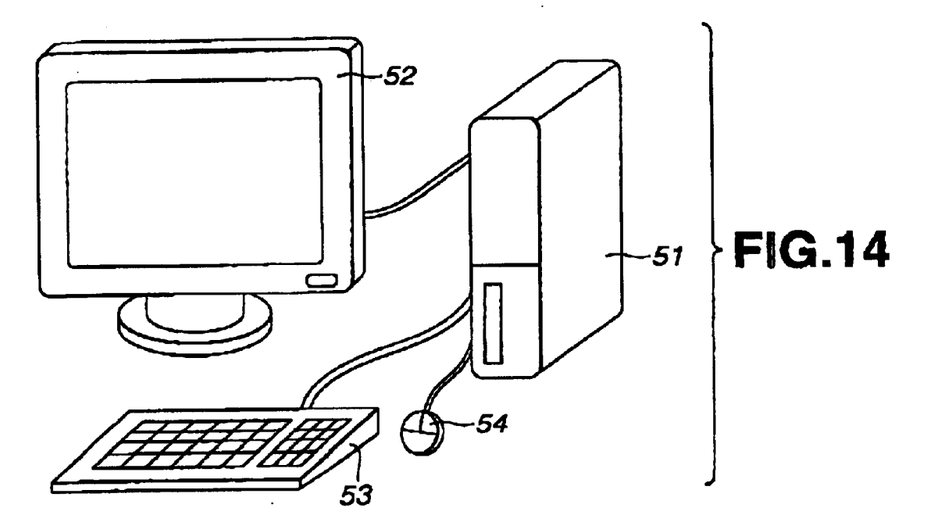
FIG. 14 is a perspective view of a personal computer of the desktop type, implementing the present invention.
Figure 15:
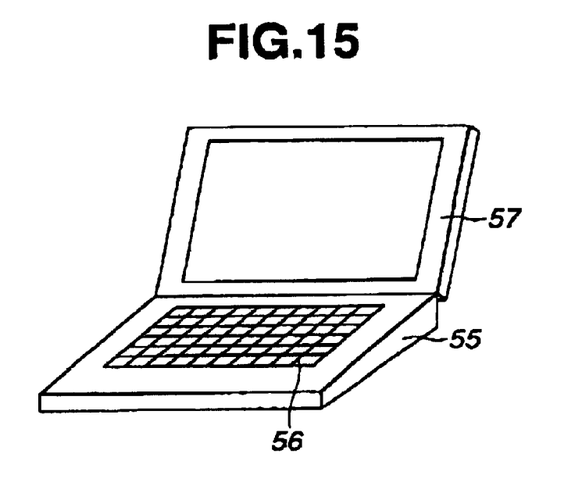
FIG. 15 is a perspective view of a personal computer of the notebook type, implementing the present invention.

FIGS. 14 and 15 shows applications of a liquid crystal display according to the present invention. In FIG. 14, a personal computer of the desktop type is illustrated, which includes a liquid crystal display 52 according to the present invention, a main hardware 51, a mouse 54 and a keyboard 53. In FIG. 15, a personal computer of the notebook type is illustrated, which includes a liquid crystal display 57 according to the present invention, a main hardware 55 and a keyboard 56. The application of the present invention is not limited to such personal computers. The present invention may be implemented in any kinds of liquid crystal display using a lamp as a light source.

While the present invention has been particularly described, in conjunction with exemplary embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-060239, filed Mar. 5, 2001, the disclosure of which is hereby incorporated by reference in its entirety.

What is claimed is:

1. A liquid crystal display, comprising:
   a rear case;
   lamp unit holders and light guide plate retaining elements extending from an upper surface of the rear case;
   a lamp unit mounted on the upper surface of the rear case via the lamp unit holders;
   a light guide plate mounted over the upper surface of the rear case and retained by the retaining elements, the lamp unit operatively positioned adjacent the light guide plate and being independent from the light guide plate;
   a first rectangular notch section extending inwardly on the rear case along a length of the lamp unit;
   a second rectangular notch section extending inwardly on the rear case along a length of the rear case opposite the first rectangular notch section;
   a liquid crystal display panel mounted proximate the light guide plate; and
   a lid covering the second notch section from a bottom surface of the rear case, wherein:
   the liquid crystal display panel includes a substrate;
   the second rectangular notch section of the rear case is formed as a storage portion receiving the substrate from the upper surface of the rear case; and
   the substrate is located intermediate the lid and the liquid crystal display panel within the storage portion of the second rectangular notch section.

2. The display of claim 1, wherein the bottom surface of the rear case is entirely planar, and the upper surface of the rear case is entirely planar apart from the lamp unit holders and the light guide plate retaining elements.

3. The display of claim 1, wherein,
   the second rectangular notch section comprises projections, and
   the lid comprises portions engaged with the projections.

4. The display of claim 1, wherein,
   the lamp unit comprises a lamp holder and a lamp mounted in the lamp holder, and
   the first rectangular notch section of the rear case comprises an opening providing an access to the lamp holder.

5. The display of claim 4, wherein the lamp holder includes a reflector partly surrounding the lamp.

6. The display of claim 4, wherein,
   one of the lamp unit holders comprises two spaced apart retainers,
   an electric socket is located between the two retainers,
   the lamp holder comprises an electric connector, and
   the electric connector is engaged in the electric socket.

7. The display of claim 1, wherein the retaining elements include means for urging the light guide plate into close relationship with the lamp unit.

8. The display of claim 1, wherein an entire lower surface of the light guide plate rests on the upper surface of the rear case.

9. The display of claim 1, wherein,
   the lamp unit holders are bridge retainers with a top plate interconnecting two parallel retainer elements,
   the rear case further comprises an elongate opening providing an access for mounting the lamp unit, from a rear side of the rear case, into the lamp unit holders.

10. The display of claim 9, wherein an electric socket is provided on an inner wall of the top plate of one of the bridge retainers.

11. The display of claim 1, wherein the liquid crystal display panel is mounted intermediate the rear case and the light guide plate.

12. A liquid crystal display, comprising:
   a rear case;
   two lamp unit holders and plural light guide plate retaining elements extending from an upper surface of the rear case;
   a lamp unit mounted in the two lamp unit holders;
   a light guide plate retained in place by the retaining elements,
   the lamp unit positioned adjacent the light guide plate and being independent from the light guide plate;
   a first notch section extending inwardly on the rear case along a length of the lamp unit;
   a second notch section extending inwardly on the rear case along a length of the rear case and parallel to the first notch section;
   a liquid crystal display panel mounted adjacent the light guide plate; and
   a lid covering the second notch section from a bottom surface of the rear case, wherein:
   the liquid crystal display panel includes a substrate;
   the second notch section is formed as a storage portion receiving the substrate; and
   the substrate is located intermediate the lid and the liquid crystal display panel within the storage portion of the second notch section.

13. The display of claim 12, wherein the bottom surface of the rear case is entirely planar, and the upper surface of the rear case is entirely planar apart from the lamp unit holders and the light guide plate retaining elements.

14. The display of claim 12, wherein,
   the second notch section comprises projections, and
   the lid comprises portions engaged with the projections.

15. The display of claim 12, wherein,
   the lamp unit comprises a lamp holder and a lamp mounted in the lamp holder, and
   the first notch section of the rear case comprises an opening providing an access to the lamp holder.

16. The display of claim 15, wherein,
   one of the lamp unit holders comprises two spaced apart retainers,
   an electric socket is located between the two retainers,
   the lamp holder comprises an electric connector, and
   the electric connector is engaged in the electric socket.

17. The display of claim 12, wherein,
   the lamp unit holders are bridge retainers with a top plate interconnecting two parallel retainer elements,
   the rear case further comprises an elongate opening providing an access for mounting the lamp unit, from a rear side of the rear case, into the lamp unit holders.

18. The display of claim 17, wherein an electric socket is provided on an inner wall of the top plate of one of the bridge retainers.

* * * * *